United States Patent [19]

Layden et al.

[11] Patent Number: 4,464,192

[45] Date of Patent: Aug. 7, 1984

[54] MOLDING PROCESS FOR FIBER REINFORCED GLASS MATRIX COMPOSITE ARTICLES

[75] Inventors: George K. Layden, Wethersfield; Karl M. Prewo, Vernon, both of Conn.

[73] Assignee: United Technologies Corporation, Hartford, Conn.

[21] Appl. No.: 381,805

[22] Filed: May 25, 1982

[51] Int. Cl.³ ............................................. C03C 25/00
[52] U.S. Cl. ......................................... 65/18.1; 65/3.2; 65/18.4; 65/33; 264/125; 428/367; 428/902; 501/95
[58] Field of Search ...................... 501/81, 95; 65/3.2, 65/4.21, 18.1, 18.4; 264/109, 111, 122, 125, 328.1, 328.2, 328.17; 428/902, 114, 367, 697

[56] References Cited

U.S. PATENT DOCUMENTS

| | | | |
|---|---|---|---|
| 2,952,041 | 9/1960 | Bernhardt | 264/328.17 |
| 4,031,601 | 6/1977 | Staub et al. | 264/328.2 X |
| 4,263,367 | 4/1981 | Prewo | 428/902 X |
| 4,314,852 | 2/1982 | Brennan et al. | 501/95 X |
| 4,324,843 | 4/1982 | Brennan et al. | 428/697 |

*Primary Examiner*—Robert L. Lindsay, Jr.
*Attorney, Agent, or Firm*—Harry J. Gwinnell

[57] ABSTRACT

A method of making complex shaped (e.g. having curved surfaces or walls) fiber reinforced glass matrix composites by injection molding is described. The injection molding can take place by heating and injecting a mixture of glass powder and chopped fibers or whiskers directly into the mold, or a billet of glass matrix material containing the chopped fibers or whiskers made with a density approximately equal to the density of the final composite can be prepared first. In one embodiment the billet is formed by admixing a polymeric binder, glass powder, and a carrier liquid with the reinforcing fibers, drying the mixture, cold pressing the mixture to less than its original volume, and hot pressing to the density desired in the final product. Either the glass powder-chopped fiber or whisker combination or the formed billet is next placed in the injection molding apparatus where it is heated at least to the softening point of the matrix glass and injected into the predetermined mold shape. It is then allowed to cool to a temperature below the strain point of the glass and ejected or otherwise removed from the mold. In addition to providing a method of making fiber reinforced glass parts which can be automated and mass produced, articles are produced which have fiber orientation and strengths in three dimensions.

3 Claims, 3 Drawing Figures

MOLDING PROCESS FOR FIBER REINFORCED GLASS MATRIX COMPOSITE ARTICLES

The Government has rights in this invention pursuant to Contract No. N00014-81-C-0218 awarded by the Department of the Navy.

DESCRIPTION

1. Technical Field

The field of art to which this invention pertains is molding processes, and particularly molding processes for fiber reinforced composite articles.

2. Background Art

Because of the scarcity and increasing expense of many conventional high temperature structural metals, increased attention has focused on non-metal fiber reinforced composites as replacements for conventional high temperature metal alloys. Use of metal replacement, high strength fiber reinforced resin and even high strength fiber reinforced metal matrix composites has progressed to the point of commercial acceptance in products ranging from supporting goods to advanced jet aircraft components. One of the big problems with these composites, however, has been their maximum use temperature.

Ceramic, glass and glass-ceramic bodies are known to the art which can be employed in high temperature applications. Unfortunately, however, these bodies frequently lack the mechanical strength desired and are invariably deficient in toughness and impact resistance. This situation has given rise to the preparation of composite bodies consisting of a matrix of ceramic, glass, or glass-ceramic material with inorganic fibers dispersed in continuous or discontinuous fashion therein. Henceforth referred to as glass matrix composites, these materials are described in U.S. Pat. Nos. 4,314,852 and 4,324,843. Glass-ceramic matrix-silicon carbide fiber composite components prepared according to the teachings of the above-reference patents exhibit physical properties which permit their utilization in heat engines and other applications to effect significant improvement in performance. Such applications, however, require that novel methods of fabrication be found for the production of complex shaped parts with reinforcing fibers distributed, for example, in at least three directions to impart improved strength.

Even though great strides have been made in this area, difficulties exist in methods of preparig such improved composite articles. In the past, continuous fiber reinforcement for composite articles has been achieved through the use of collimated fiber tapes, felts and papers which are infiltrated with glass-carrier slurries, cut to size, and oriented and then stacked in a die for hot pressing. However, this procedure is inadequate for more complex shapes in that it achieves only a planar array of fibers. It is also difficult to form cylinders and other complex shapes with such materials.

Furthermore, in many resin, metal and even glass matrix composite applications careful prearrangement of fiber reinforcement is not required and a more random distribution of e.g. chopped fibers would provide adequate performance characteristics. This would also permit rapid, low cost fabrication of precisely shaped articles.

Accordingly, what is needed in this art is a rapid, relatively simple method of forming glass matrix composites particularly adapted to forming such composites in complex shape.

DISCLOSURE OF INVENTION

The present invention is directed to the method of forming fiber reinforced glass matrix material, particularly adapted to forming such material in complex shapes (e.g. having curved sides or walls). The method comprises injection molding a mixture of glass powder and chopped, high temperature stable reinforcing fibers or whiskers into a mold of such complex shape. The mixture of fibers and glass powder may be injection molded directly into the mold of complex shape, or a billet or slug of the glass matrix material and chopped fibers or whiskers of a density approximately that of the final composite may be made first. Such billets may be made directly from the glass powder-chopped fiber (or whisker) composition itself, or a polymeric binder may be used. If a polymeric binder is used, the billets are formed by mixing the fibers or whiskers into a slurry of glass powder, polymeric binder and carrier liquid. After mixing, the mix of materials is dried to a reduced carrier liquid volume. This dried material is then cold pressed to reduced volume. It is then placed in a hot pressing mold and the temperature raised to drive off the remaining carrier liquid and binder. This material is subsequently hot pressed to produce the desired billet. This billet is then ready for injection molding.

The glass powder-chopped fiber or whisker mixture or the formed billet is next placed in an injection molding machine, and the temperature of the billet is raised to a point where the glass is softened and capable of being injected into a heated mold of the desired shape. Such injection is next performed, and the mold allowed to cool to a temperature below that of the strain point of the glass at which time the part is ejected or otherwise removed. The resulting product has fiber orientation and strength in three dimensions.

The foregoing and other features and advantages of the present invention will become more apparent from the following description and accompanying drawing.

BEST MODE FOR CARRYING OUT THE INVENTION

Figure 1:
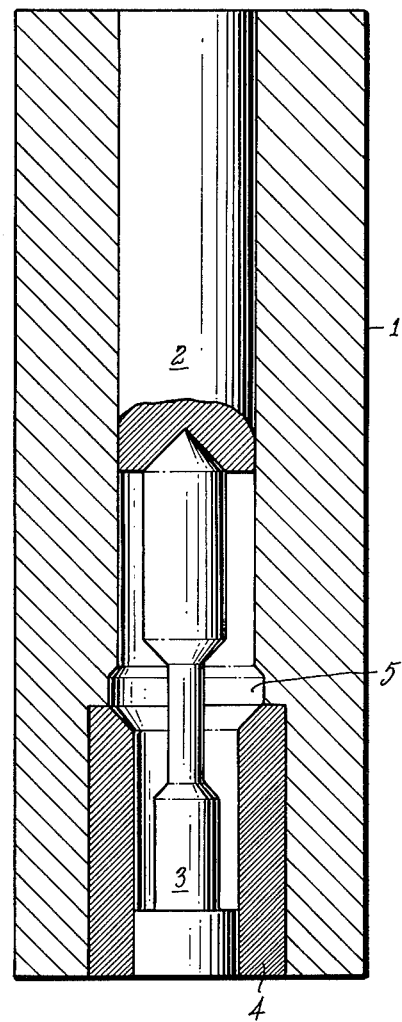
FIG. 1 shows a complex axisymmetric shape mold useful with the present invention.

While any glass which will impart high temperature strength properties to composites according to the present invention can be used with the present invention, Corning 1723 (Corning Glass Works) aluminosilicate glass was found well-suited for this process. Similarly, Corning 7740 borosilicate glass and Corning 7930 high silicon content glass (about 96% by weight silica) obtained by leaching the boron from a borosilicate glass are preferred borosilicate and high silica content glasses, respectively. While the borosilicate glass and the aluminosilicate glass can be used in its as received −325 mesh size form, the desired properties for the high silica content glass composites have only been satisfactorily fabricated with the glass after it has been ball milled in propanol for more than 100 hours. It should also be noted that mixtures of the above glasses may also be used.

Another attractive matrix material for the process of the present invention is a glass-ceramic. During composite densification the matrix is retained i the glassy state, thus avoiding fiber damage and promoting densification under low applied pressure. After densification to the desired fiber plus matrix configuration, the glassy matrix can be converted to the crystalline state, the degree and extent of crystallization being controlled by the matrix composition and heat treatment schedule employed. A wide variety of glass-ceramics can be used in this manner, however, when using silicon carbide fibers a strict limitation on the amount and activity of titanium present in the glass is of controlling importance. Accordingly, if silicon carbide fibers and titania nucleating agents are used, the titania must be inactivated or kept below 1% by weight. This can be accomplished by simply substituting another nucleating agent such as zirconia for the conventional titania or adding an agent to mask the reactivity of the titania toward the silicon carbide fiber. However, in any case it is necessary to either eliminate or mask the effects of the titania on the silicon carbide fiber to attain a composite with good high temperature strength properties. And while conventional lithium aluminosilicate is the preferred glass-ceramic, other conventional glass-ceramics such as aluminosilicate, magnesium aluminosilicate, and combinations of the above can be used as long as the ceramic matrix material is titanium free (less than about 1% by weight) or masked. Note commonly assigned U.S. Pat. No. 4,324,843, the disclosure of which is incorporated by reference.

In general the starting glass-ceramic material can be obtained in the glassy state in powder form. If, however, the ceramic material is obtained in crystalline form, it will be necessary to melt the material to form it into the glassy state, solidify it and subsequently crush it into powder form, preferably about −325 mesh, prior to making up the slurries according to the present invention. It is important in selecting a glass-ceramic material that one be selected which can be densified in the glassy state with the viscosity low enough to permit complete densification with subsequent transformation into a substantially completely crystalline state. It is also possible, however, to convert the starting crystalline powder to the glassy state during preheat treatment prior to application of pressure for densification.

While any high temperature stable fiber material can be used in the method according to the present invention, such as graphite, alumina, or silicon nitride, silicon carbide fibers are especially preferred. A multifilament silicon carbide yarn with an average filament diameter up to 50 microns, for example 5 to 50 microns, is especially preferred. Nippon Carbon Company of Japan produces such a yarn with about 250 fibers per tow and an average fiber diameter of about 10 microns. The average strength of the fiber is approximately 2000 MPa and it has a use temperature of up to 1200° C. The yarn has a density of approximately 2.6 grams per cubic centimeter and an elastic modulus of approximately 221 GPa. Prior to use in the present invention this fiber is chopped to a length useful with the intended mold. The length selected depends on the smallest size mold wall thickness. The molding composition will be required to pass through and should be short enough to prevent clumping when passing through such mold wall. Typically such fibers will be less than 0.75 inch in length and, for example, with a mold wall thickness of about 0.1 inch, fibers less than 0.5 inch in length were used. Fiber whiskers, such as F-9 Silicon Carbide marketed by Exxon Enterprises of SNW-Silicon Nitride made by Tateho Chemical Industries Co., Ltd. of Japan may also be used.

In some instances, depending upon the size and shape of the part to be made, a simple mechanical mixture of chopped fibers (or whiskers) and glass powder such as achievable in a suitable blender may constitute a suitable molding compound which can be injection molded without further predensification. However, the very low density of such mixtures (typically about 10% of the density of the molded object) would require a very large molding apparatus with substantial debulking capability. The more suitable molding compound is constituted by pellets, slugs or suitably shaped billets of fully densified composite material formed by hot pressing or hot isostatic pressing as described below.

Any polymeric binder which dissolves or disperses readily in the particular carrier material selected and provides lubricity to facilitate cold pressing can be used with the present invention. The Carbowax ® (Union Carbide Corporation) series of polymers and in particular Carbowax 4000 have been found to be particularly suitable binder materials for the process of the present invention. Accordingly, any carrier material compatible with such binders can also be used, with water being preferred.

While the amounts of the materials may vary, the slurry is generally prepared so that the mixture of glass powder, binder, and carrier liquid gives a stiff mixture when added to the fibers. Typically the amount of glass added will be such as to give an about 15% to about 50% by volume concentration of fibers when the carrier liquid and binder have been removed. Typically, for each gram of −325 mesh glass powder in the slurry there will be about 0.75 milliliters of carrier liquid (preferably water), and about 0.1 grams of organic binder. The final molded article generally contains about 50% to about 85% by volume glass matrix and preferably about 70%.

When mixing the glass-binder-water slurry with the fibers, it is preferred to pour the slurry over the mass of chopped fiber and blend with a suitable device or implement. When the typical proportions given about are employed, it will be found that stirring and tumbling action imparted to the constituents will serve to break up the stiff mix into agglomerates of a size characterized by the fiber length. It will also be found that the slurry will not drain from agglomerates when the blending is complete.

After forming the agglomerates the carrier liquid and binder are removed without damage to the fibers. With silicon carbide or alumina fibers an air atmosphere is appropriate, but carbon fibers would require an inert atmosphere such as argon. Heating is performed to first remove the carrier liquid, then decompose and drive off the binder, and finally heat to a temperature where the glass powder begins to sinter. This will prevent the agglomerates from shedding the glass constituents in subsequent handling. This product may then be hot pressed to form suitable billets for injection molding.

The preferred method, however, is to take the glass, binder, carrier liquid and fiber mixture and dry it to reduced water content, e.g. less than 25% and typically about 10% by weight water content. This is then cold pressed in a suitable mold so as to accomplish a volume reduction, e.g. less than half and typically to about 25% of original volume. A slight springback of about 5% will be encountered when the press ram is withdrawn.

In such mold the temperature is raised to drive off the remaining water and binder. Wall friction will prevent further springback during this outgassing. Hot pressing is then performed to the density desired for the final product. This method of cold preconsolidation followed by hot pressing affords large economy since most of the consolidation is accomplished in a relatively inexpensive cold pressing operation and a much smaller hot press is thus required.

The billet is now ready for injection molding. In a suitably designed injection molding machine the glass-fiber billet is raised to a temperature at least as high as the softening point of the matrix glass. It is then injected into a heated mold of the desired shape allowing the mold to cool to a temperature near that of the strain point of the glass and ejected or otherwise removed from the mold.

EXAMPLE

Figure 2:
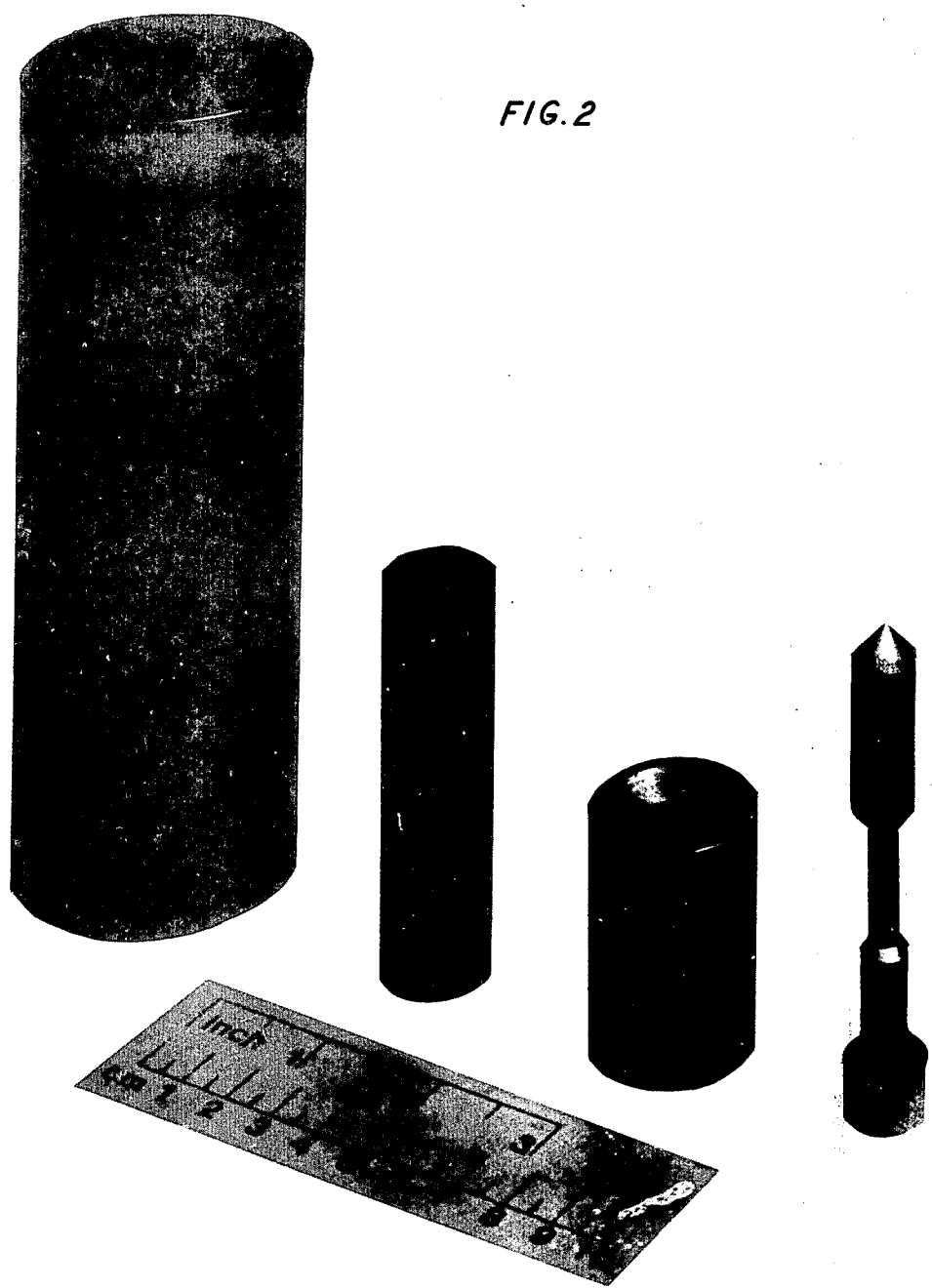
FIG. 2 shows the various parts of the mold disassembled.
Figure 3:
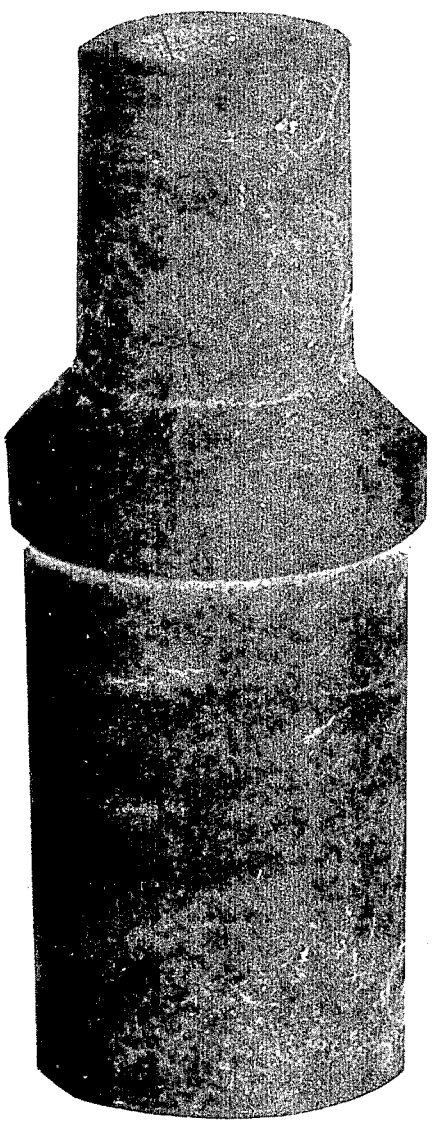
FIG. 3 shows a final molded part.
Figure 3:

To a weight of 58.7 grams of Nicalon ® silicon carbide fibers (Nippon Carbon Co.) one-half inch in length was added a slurry of 176.1 grams of Corning 1723 aluminosilicate glass powder—325 mesh, 132.1 ml of water and 17.6 grams of Carbowax. The mix was blended by stirring and tumbling with a spoon. After drying to about 10% by weight water content, the mix was cold pressed into a stainless steel container for later hot isostatic pressing. The container was then outgassed, sealed and hot pressed at 10,000 psi pressure at a temperature of 1200° C. for one-half hour in a hot isostatic press. A four part injection molding device was machined from graphite in the shape of a complex axi-symmetric insulator from a jet engine igniter. This is shown in plan view in FIG. 1 and the individual parts of corresponding number shown in FIG. 2. This demonstrates the complexity of shapes which can be made according to the present invention. Characters 1, 3 and 4 represent the mold or die region and 2 represents the plunger. The volume of the mold region 5 was carefully determined and a slug of the above described molding material having identical volume was cut from the hot isostatically pressed billet and placed in the reservoir, which would be area 2 shown in FIG. 1 occupied by the plunger. The injection molding device was then placed in a vacuum hot press and heated to 1300° C. and a pressure calculated to be 2000 psi was applied to the plunger and maintained for ten minutes. Furnace power was then shut off and the assembly cooled to room temperature. The injection molded part was removed from the mold and the inner mandrel was machined away. Residual carbon adhering to the part was removed by heating in air to 650° C. and sandblasting to remove the white ash residue. The finish molded part is shown in FIG. 3. The patterns of the silicon carbide fiber can be clearly seen on the sandblasted surface.

Not only does the present invention provide a method which is readily adaptable to making complex shapes of fiber reinforced glass matrix composites by mass production, but the resulting article has unusual strength in three dimensions by virtue of the three-dimensional random orientation of the fibers.

Typical complex shapes which may be made by the process of the present invention are cylindrical shapes such as gun barrels, hollow containers, such as cups, spark plug and ignitor insulators, and other internal combustion engine components, etc. The articles of the present invention based on the compositions of the components also have particular utility as high temperature structural components in environments where oxidation resistance, high strength, and toughness are required, for example as gas turbine engine or internal combustion engine components.

Although the invention has been shown and described with respect to detailed embodiments thereof, it should be understood by those skilled in this art that various changes and omissions in form and detail may be made therein without departing from the spirit and scope of the invention.

I claim:

1. A method of forming a fiber reinforced glass or glass-ceramic matrix composite, particularly adapted to forming such composite in complex shapes, comprising mixing high temperature stable reinforcing graphite, alumina, silicon nitride, or silicon carbide chopped fibers less than 0.75 inch in length with high silica content glass, borosilicate glass, or aluminosilicate glass or glass-ceramic, a polymeric binder, and a carrier liquid; drying the mixture to reduce the carrier liquid content to less than about 25% of original volume; cold pressing the dried mixture to less than half of its original volume; heating the cold pressed mixture to evaporate the remainder of the carrier liquid and decompose and remove the polymeric binder; hot pressing the thus consolidated mixture to a billet of predetermind density; heating the billet to a temperature above the softening point of the matrix; injecting the heat softened billet into a preheated mold of predetermined shape; allowing the mold to cool to a temperature below the strain point of the glass; and removing the molded part having fiber orientation and strength in three dimensions from the mold.

2. The method of claim 1 wherein the carrier liquid is water, the matrix is −325 mesh aluminosilicate glass or glass-ceramic, the fiber is silicon carbide and the binder is a polymeric wax.

3. The method of claim 1 wherein the mixture is dried to about 10% by weight carrier liquid content and the dried mixture is cold pressed to about 25% of its original volume.

* * * * *